United States Patent

[11] 3,586,164

| [72] | Inventor | James L. Pool |
| | | Clarinda, Iowa |
| [21] | Appl. No. | 792,270 |
| [22] | Filed | Jan. 21, 1969 |
| [45] | Patented | June 22, 1971 |
| [73] | Assignee | Lisle Corporation |
| | | Clarinda, Iowa |

[54] HARDNESS DETECTOR AND ARTICLE SELECTING DEVICE
2 Claims, 6 Drawing Figs.

[52] U.S. Cl. .................................................. 209/73,
209/111.8, 324/34
[51] Int. Cl. .................................................. B07c 5/34
[50] Field of Search .......................................... 209/73, 74,
81, 81 H, 111.8; 324/34 H

[56] References Cited
UNITED STATES PATENTS

| 2,234,456 | 3/1941 | Schaurte et al. | 209/81.1 |
| 2,427,774 | 9/1947 | Fredrickson | 324/34 (H) |
| 2,645,341 | 7/1953 | Diamond | 324/34 (H) |
| 2,647,628 | 8/1953 | Diamond | 324/34 (H) |
| 2,689,042 | 9/1954 | Diamond | 324/34 (H) |
| 2,796,986 | 6/1957 | Rajchman | 209/81.1 |
| 2,822,088 | 2/1958 | Beaumont | 324/34 (H) |
| 2,846,065 | 8/1958 | Alexander | 324/34 (H) |
| 2,858,018 | 10/1958 | Alexander | 209/74 |
| 3,432,747 | 3/1969 | Quittner | 324/34 (H) |
| 3,478,876 | 11/1969 | Littwin et al. | 209/111.8 X |

Primary Examiner—Allen N. Knowles
Attorney—Molinare, Allegretti, Newitt & Witcoff ABSTRACT: A device for detecting hardness in malleable castings and the like, selecting the castings below a predetermined hardness for machine and rejecting those above such predetermined hardness. Automatic operation of the selecting means is effected by conveying spaced articles past a magnetizing means where they are magnetized, then past a magnetism-sensing means after a predetermined time period so that the sensing means senses residual magnetism in the articles, the output of the sensing means operating a magnetism evaluating means which is adjusted for operating an article selecting device above a predetermined adjusted threshold to remove the rejected article from the conveyor, whereas those articles with a hardness below the threshold value remain on the conveyor as acceptable for machining purposes.

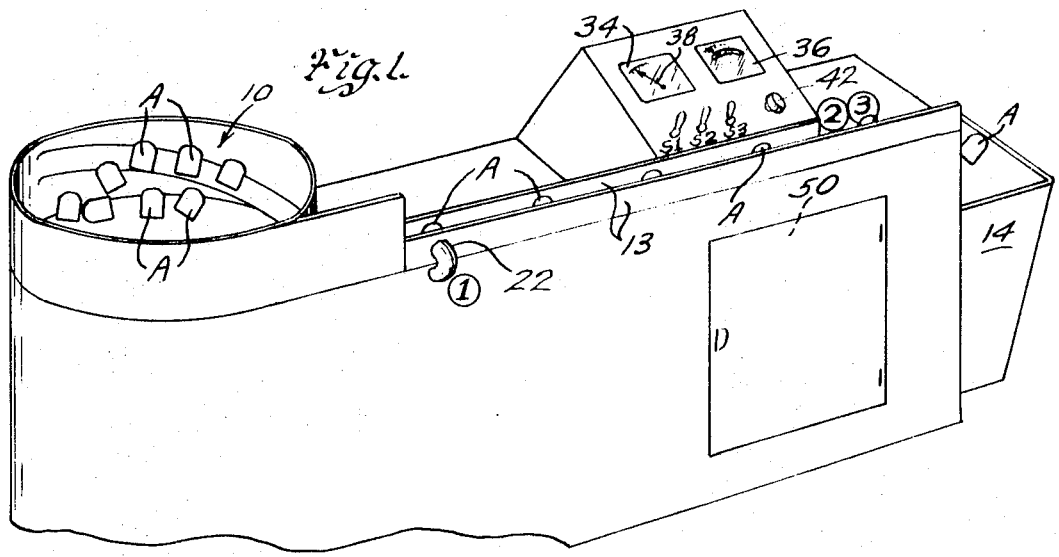
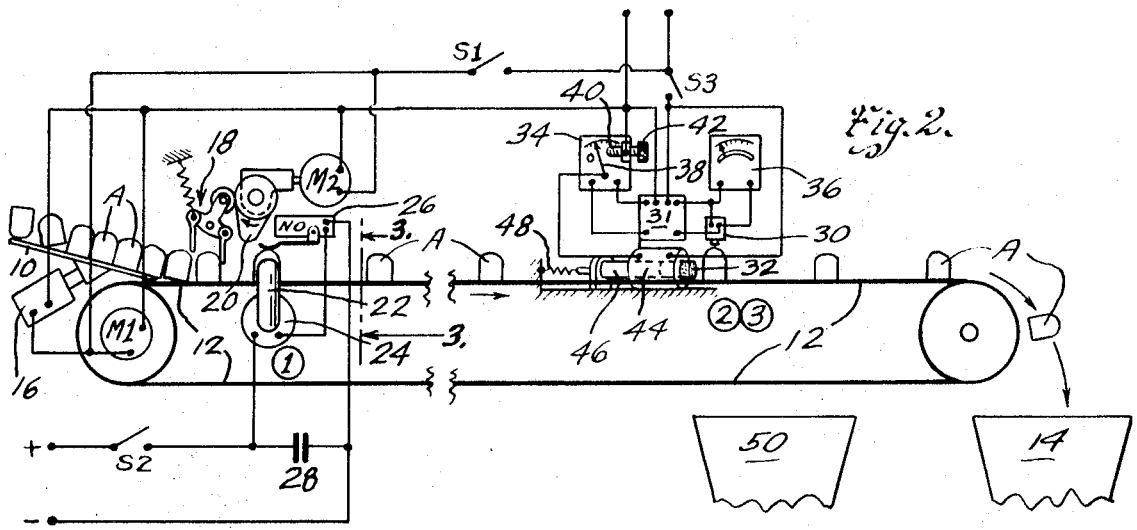
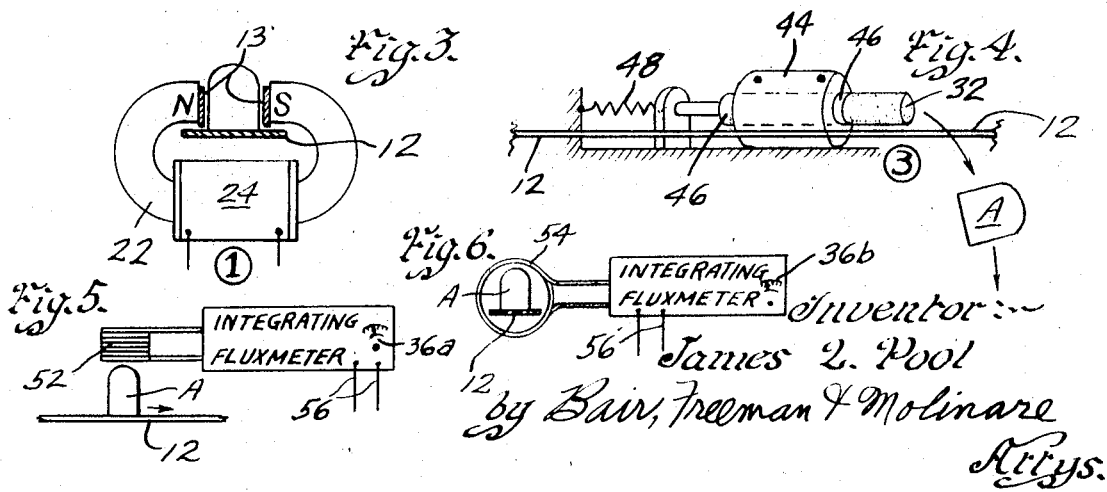

HARDNESS DETECTOR AND ARTICLE SELECTING DEVICE

BACKGROUND OF THE INVENTION

The invention relates to a device for detecting the average hardness of malleable parts and for rejecting those parts which are above a manually adjustable limit. Hard castings or hard spots in malleable castings are generally caused by impurities in the iron or an improper anneal. A casting that is too hard to be readily machinable tears up milling or threading equipment. Foundaries presently test castings for hardness; however, typically they use a Brinell hardness test which checks only a very small area on the surface of the casting. This same part may have a hard spot elsewhere on the casting that the Brinell method of testing would not indicate. To eliminate expensive downtime and broken tools resulting from occasional hard (unannealed) castings, my device removes hard castings from a group of those passing through the device so that only those that are acceptable for machining issue from the device.

Scott U.S. Pat. No. 2,444,751 shows a device for sorting magnetic articles according to their residual magnetism, but the manner of magnetizing the articles and sensing the magnetism is unreliable, requires a long vertical tube through which the articles drop by gravity, and is not entirely suitable for sorting malleable castings and the like. On the other hand, I provide a hardness detector in which the articles such as castings are suitably spaced on a moving conveyor belt, magnetized at one station on the belt and the residual magnetism in the casting is sensed at another station spaced along the belt, the distance and speed of travel being such as to permit something like 90 percent of the residual magnetism to be dissipated (which takes less than one second of time) before the article reaches the magnetism sensing station. By then utilizing an efficient magnetism sensing device such as a Hall effect probe, a current is generated by passage of the article past the probe, which current is amplified and fed to a magnetism evaluating means such as a milliammeter provided with an adjustable contact for establishing a circuit when the armature of the evaluating means responds to a predetermined value, and utilizing that circuit as a means to operate an article selecting device such as a solenoid wherein the movement of the plunger thereof in response to energization of the coil thereof effects removal of the article from the conveyor belt as a rejected article because it is too hard for satisfactory machining.

Accordingly, one object of the invention is to provide a device having means for conveying spaced articles past a magnetizing station, a magnetism sensing station and an article selecting station, to provide means at the magnetizing station for magnetizing the articles as they pass it by means of a magnetizing coil or the like, the magnetizing means being periodically energized by an article-position sensing switch, and being preferably of the impulse type wherein, during the time between successive articles passing the station, the magnetizing current is stored in a capacitor.

Another object is to provide sensing means in the form of a probe at the sensing station which senses the magnetism as by utilizing the Hall effect, the probe generating a current which can be read on a Gaussmeter and which can also be amplified and fed into a magnetism evaluating means such as a milliammeter or the like.

Still another object is to provide the evaluating means with circuit closing means to close a circuit when the value is above a predetermined selected value but leave it remain open when below that value.

A further object is to utilize the circuit closing means of the evaluating means energize a solenoid coil or the like which thereupon actuates a solenoid plunger which in turn is operable to remove the article from the conveyor since it is a reject because of being too hard.

Still a further object is to provide adjusting means for the circuit controlled by the evaluating means which can be adjusted in accordance to a known hard article and thereby the device calibrated as between acceptable and rejected articles.

BRIEF SUMMARY OF THE INVENTION

An article conveyor is provided with means to deliver articles thereto and space them on the conveyor for the purpose of conveying them past magnetizing, magnetism sensing and article selecting stations. Magnetizing means at the magnetizing station magnetizes each article as it passes that station. Time is controlled by the speed of the conveyor and the distance from the magnetizing station to the magnetism sensing station. Some distance is a requirement to prevent the magnetizing means from unduly affecting the magnetism sensing means. At the magnetism sensing station, means is provided for sensing the residual magnetism in the article and for controlling a selecting circuit accordingly. The selecting circuit operates a selecting device which rejects the article upon closure of the circuit but does not reject it if the circuit remains open. Accordingly, by adjusting the contacts of the circuit for the selecting device, articles of predetermined hardness because of residual magnetism are selected as to those acceptable for machining and those which should be rejected as too hard and therefore detrimental to the life of the machining tools such as drills, taps, milling cutters and the like

BRIEF DESCRIPTION OF THE DRAWINGS

FIG. 1 is a perspective view of a hardness detector and article selecting device embodying my invention;

FIG. 2 is a mechanical and electrical diagram thereof and includes magnetism sensing means using the Hall effect and an article selecting means in accepting position;

FIG. 3 is an enlarged vertical sectional view on the line 3-3 of FIG. 2 showing details of one form of magnetizing means;

FIG. 4 shows an enlargement of the article selecting means of FIG. 2 but in a rejecting position;

FIG. 5 shows diagrammatically magnetism sensing means using an integrating fluxmeter; and FIG. 6 is a similar diagram showing a different sensing coil arrangement in relation to an article, the magnetism of which is to be sensed.

DESCRIPTION OF AN EMBODIMENT OF THE INVENTION

On the accompanying drawing I have used the reference numeral 10 to indicate a vibratory feeder for articles such as small castings and the like, for example plug bodies for magnetic plugs of the kind shown in Lisle U.S. Pat. No. 2,242,830 which require a threading operation. The device herein disclosed is not limited to magnetic plugs however, but is adaptable for many different sizes and shapes of castings or the like which require machining operations such as drilling, milling, tapping and the like. The feeder 10 feeds articles A, orients the articles and feeds them to a conveyor belt 12 having an intake end as shown at the left end of FIG. 2 and an opposite discharge end. The conveyor belt discharges the articles therefrom into an "acceptable" hopper or the like 14, and may be driven by a motor M1 under control of a manual switch S1 for stopping the operation of the conveyor after hardness detecting and article selecting operations have been performed on a batch of articles in the feeder 10. The feeder is shown diagrammatically as vibrated by a vibratory coil 16 also under control of the switch S1.

The feeder 10 is designed in well-known manner to orient and feed the articles A onto the conveyor 12 in closely spaced formation, but it is necessary to space the articles on the conveyor and this can be accomplished by an escapement mechanism or the like 18 which may be driven by a motor M2 connected to the manual switch S1 for energization only when it is closed. The escapement mechanism may be operated by a cam 20 suitably timed in relation to the speed of the conveyor belt 12.

Along the belt 12 there are three stations (1), (2) and (3) which are magnetizing, magnetism sensing and article selecting stations respectively.

At station (1), magnetizing means is provided which may comprise a C-shaped core 22 and a coil 24. In order to energize the coil 24 a source of direct current is required which may be controlled by a manual switch S2 as shown in FIG. 2. It is desirable, however, to have an article position sensing means as energization of the coil 24 is needed only when an article A is between the north and south poles of the core 22. This may comprise, for instance, a microswitch 26 actuated by the presence of the article A st station (1), and additionally, it is desirable that the coil 24 be energized by impulse such as produced by a capacitor 28 charged during the time the switch 26 is open and discharged through the coil 24 during the time the switch 26 is closed.

Any type of sensing device in place of the switch 26 may be provided such as an airblast type or an electric eye type.

At station (2) magnetism sensing means is provided and indicated at 30. This may comprises a Hall effect probe furnishing current for actuating an article-removing element 32 at station (3). By way of example, the current generated in the probe 30 when an article A passes station (2) may be amplified by an amplifier 31 and fed into the coil of a milliammeter 34 which thereby provides magnetism evaluating means. Additionally, the current from the probe 30 may be fed to the coil of a Gaussmeter 36 so that the magnetism in each article may be "read out" if desired.

The milliammeter 34 is illustrated as a circuit closer type as between its needle 38 and a contact 40. The contact 40 is adjustable as by a knob 42, and the circuit just referred to may be manually controlled by a switch S3. This circuit is provided for a solenoid 44, the plunger of which is shown at 46, the article removing element 32 being an extension thereof. A return spring 48 normally positions the plunger 46 and the element 32 as shown in FIG. 2, but when the coil of the solenoid 44 is energized the plunger and article removing element will move to the position shown in FIG. 4, thereby pushing the article A off the conveyor belt 12 and into a hopper 50 for rejected castings.

While I have shown mechanism at the selecting station (3) to remove rejected articles from the conveyor belt 12 in response to a high reading on the meter 34, obviously acceptable articles could be removed in response to a low reading and the rejected articles carried to the discharge end of the conveyor.

In FIG. 5 an integrating fluxmeter including a meter 36a is shown with a sensing coil 52 which may be arranged for the articles A to pass thereunder. Another possibility is shown in FIG. 6 wherein the integrating fluxmeter has a sensing coil 54 surrounding the conveyor belt 12 and the articles A carried thereby, and is readable on a meter 36b. Output wires 56 are illustrated which furnish output current to the amplifier 31 and the milliammeter 34 as in FIG. 2 for the purpose of closing the circuit at 38, 40 as already described for article selecting and rejecting purposes.

The switches S1, S2 and S3 are illustrated in FIG. 1, and are operable to shut down the detector and selecting device disclosed or to place any one of the three parts of the apparatus controlled by the respective switches in operation as desired. The adjusting knob 42 can be related to the reading on the Gaussmeter 36, or the meters 36a or 36b as the case may be, or related to an article A of known objectionable hardness, and set accordingly. Thus, articles which unduly dull the tools for machining them can be used for calibration purposes by passing them through the device and adjusting the knob 42 accordingly, thus providing a convenient calibrating method for the device.

The magnetism sensing means senses average hardness of malleable parts before machining and through the operation of the selecting means 32, 44, 46 removes all articles above acceptable limits of hardness. Unlike Brinell hardness tests which check only a very small area on the surface of a casting, my device senses the residual magnetism in the casting after predetermined magnetization thereof and after a predetermined time period following the magnetizing operation. Properly annealed castings will not retain sufficient magnetism to cause the current from the probe 30 to move the needle 38 against the contact 40 whereas those that have not been properly annealed will have local hard spots in them which do cause the current from the probe to move the needle against the contact and thereby effect rejection of that particular casting.

By using an integrating fluxmeter and sensing coil 52 or 54 therefor as illustrated in FIGS. 5 and 6, another method of sensing the residual magnetism is illustrated. By moving magnetized articles past the coil 52 as in FIG. 5 or through the coil 54 as in FIG. 6, a measurable change or reading on the meter 36a or 36b is had and the output of the fluxmeter may be fed to the amplifier 31 in the same way that the output of the Hall effect probe 30 in FIG. 2 is fed. A sensing coil 52 or 54 senses a larger area or volume than does the Hall effect probe, which has some advantages, particularly with larger parts because of the inability of the Hall probe to reach out very far. Also a sensing coil of an integrating fluxmeter averages the hardness of the entire part and in some cases this is an advantage. An irregularly shaped article can pass over or through the coil in any direction without affecting the reading, and a sensing coil in place of a Hall probe is accordingly less sensitive to the position of the article in relation to the coil. Small round articles are no problem with a Hall probe but larger irregularly shaped articles do not work as well with it as with the sensing coil of a fluxmeter, particularly since poor malleable iron tends to be reasonably uniform in its hardness rather than having just a small hard spot. Accordingly, each type of instrument has its advantages depending on the type of article, casting or the like being checked.

Hard castings or hard spots in malleable castings are generally caused by impurities in the iron or an improper anneal. Either way the result is the same—a casting that is too hard to be readily machinable and in the process dulls the cutting edges of tools. Without detecting and rejecting hard castings much time can be spent in a manufacturing plant repairing broken or dulled tools. Quite often this causes breakdowns and delays which can be eliminated by proper rejection of castings which are too hard for satisfactory machining.

Since any ferrous metal will accept a magnetic charge, I provide means for magnetizing the castings at station (1). Since a hard spot in a casting will retain its magnetic charge whereas a good casting (not too hard) will lose most of that charge almost immediately, I provide proper coordination between the speed of the conveyor belt 12 and the distance between stations (1) and (2) to utilize this principle to provide an operable detector and selecting means.

I claim as my invention:

1. In a hardness detector and article selecting device comprising in combination conveyor means to carry articles to be tested, means to impart a magnetic field to each of said conveyed articles, sensing means which sense and measure said retained magnetic fields and thereby operate means to accept or reject each of said magnetized articles depending upon the amount of magnetic field retained, the improvement comprising:

said sensing means having a Hall effect probe and a Gaussmeter actuated by said probe, means to amplify the current generated in said probe, a milliammeter having a coil, said amplified current signal originally generated in said probe being fed into said coil of said milliammeter, and a manually adjustable contact making device for said milliammeter connected in series with means to accept or reject said articles which permits adjustment to select a desired level of magnetic field and thus hardness for the article to be tested.

2. In a hardness detector and article selecting device comprising in combination conveyor means to carry articles to be tested, means to impart a magnetic field to each of said conveyed articles, sensing means which sense and measure said retained magnetic fields and thereby operate means to accept or reject each of said magnetized articles depending upon the amount of magnetic field retained, the improvement comprising:

said sensing means having an integrating fluxmeter and means to amplify the current generated by said integrating fluxmeter, a milliammeter having a coil, said amplified current signal originally generated by said integrating fluxmeter being fed into said coil of said milliammeter, and a manually adjustable contact making device for said milliammeter connected in series with means to accept or reject said articles which permits adjustment to select a desired level of magnetic field and thus hardness for the article to be tested.